(12) United States Patent
Turi et al.

(10) Patent No.: US 10,171,864 B2
(45) Date of Patent: Jan. 1, 2019

(54) INTERACTIVE TELEVISION APPLICATIONS

(71) Applicant: SKY CP LIMITED, Isleworth (GB)

(72) Inventors: Davide Turi, Isleworth (GB); Jeremy Worthington, Isleworth (GB); Samuel Billaud, Isleworth (GB); Anthony Davies, Isleworth (GB)

(73) Assignee: Sky CP Limited (GB)

( * ) Notice: Subject to any disclaimer, the term of this patent is extended or adjusted under 35 U.S.C. 154(b) by 0 days.

(21) Appl. No.: 15/545,290

(22) PCT Filed: Jan. 22, 2016

(86) PCT No.: PCT/GB2016/050142
§ 371 (c)(1),
(2) Date: Jul. 20, 2017

(87) PCT Pub. No.: WO2016/116766
PCT Pub. Date: Jul. 28, 2016

(65) Prior Publication Data
US 2018/0014062 A1    Jan. 11, 2018

(30) Foreign Application Priority Data
Jan. 22, 2015    (EP) ..................................... 15152178

(51) Int. Cl.
*H04N 21/47*       (2011.01)
*H04N 21/482*      (2011.01)
(Continued)

(52) U.S. Cl.
CPC ..... *H04N 21/4312* (2013.01); *H04N 21/4314* (2013.01); *H04N 21/4316* (2013.01);
(Continued)

(58) Field of Classification Search
CPC .... H04N 21/47; H04N 21/482; H04N 21/485; G06F 3/048
(Continued)

(56) References Cited

U.S. PATENT DOCUMENTS 5,589,892 A * 12/1996 Knee .................. A63F 13/12
                                             348/564
2002/0056083 A1    5/2002 Istvan
(Continued)

FOREIGN PATENT DOCUMENTS

EP        1111926 A2    6/2001
EP        1777950 A2    4/2007
(Continued)

OTHER PUBLICATIONS

Klungsoyr G K: "Service Platforms for Next Generation Interactive Television services", Telektronikk, Telenor AS, Norway, Mar. 2, 2002 (Mar. 2, 2002), pp. 94 109, XP002353639, ISSN: 00857130XP.
(Continued)

*Primary Examiner* — Dominic D Saltarelli
(74) *Attorney, Agent, or Firm* — Katten Muchin Rosenman LLP

(57) ABSTRACT

An interactive user interface (AW) of an interactive application is provided simultaneously with a programme display (P) within a display area of a television receiver, wherein a proportion of the display area occupied by the interactive user interface (AW) increases in response to user interaction with the interactive user interface (AW).

15 Claims, 10 Drawing Sheets

(51) Int. Cl.
   *H04N 21/485*   (2011.01)
   *H04N 21/431*   (2011.01)
   *H04N 21/443*   (2011.01)
   *H04N 21/4782*  (2011.01)

(52) U.S. Cl.
   CPC ..... *H04N 21/4438* (2013.01); *H04N 21/4782* (2013.01); *H04N 21/482* (2013.01); *H04N 21/4858* (2013.01)

(58) Field of Classification Search
   USPC ........................................ 725/37–41, 43, 52
   See application file for complete search history.

(56) References Cited

U.S. PATENT DOCUMENTS

| | | |
|---|---|---|
| 2008/0244671 A1 | 10/2008 | Moon et al. |
| 2009/0119708 A1 | 5/2009 | Harrar et al. |
| 2011/0037896 A1 | 2/2011 | Lin et al. |
| 2012/0324507 A1 | 12/2012 | Weber |
| 2014/0325556 A1 | 10/2014 | Hoang et al. |

FOREIGN PATENT DOCUMENTS

| | | |
|---|---|---|
| EP | 2424264 A2 | 2/2012 |
| EP | 2819406 A1 | 12/2014 |
| WO | 9637996 A1 | 11/1996 |
| WO | 9723997 A1 | 7/1997 |
| WO | 200111865 A1 | 2/2001 |
| WO | 2006125999 A1 | 11/2006 |
| WO | 2014029965 A1 | 2/2014 |

OTHER PUBLICATIONS

Sony: "LCD Digital Colour TV", Feb. 29, 2012 (Feb. 29, 2012), pp. 1 176, XP002756515, Retrieved from the Internet <URL:http://citenpl.internal.epo.org/wf/web/citenpl/citenpl.html?_url=http%3A//pdf.crse.com/manuals/4269995261.pdf>XP.

Tomari, et. al. 'Design and Implementation of Internet TV' Aug. 1, 1997, s. 4.1 'Dual Screen Function'.

International Search Report and Written Opinion dated Apr. 8, 2016 in PCT patent application No. PCT/GB2016/050142.

* cited by examiner

INTERACTIVE TELEVISION APPLICATIONS

CROSS REFERENCE TO RELATED APPLICATIONS

The present application is a National Stage application of and from PCT/GB2016/050142 filed Jan. 22, 2016, which claims priority to European Patent application 15152178.8 filed Jan. 22, 2015, both of which are incorporated by reference in their entirety. No new matter has been added.

FIELD OF THE INVENTION

The present invention relates to interactive television applications, and to apparatus, methods and computer programs for implementing such applications.

BACKGROUND OF THE INVENTION

Interactive television applications include so-called 'Red Button' functionality, in which a user is prompted to access additional content by an icon (e.g. a 'Red Button') overlaid on a displayed programme or advertisement. The user responds to the icon by pressing a corresponding key (e.g. a red button on the user remote). The displayed programme is then replaced by a display of interactive content, for example additional programme content obtained from 'side channels', information relating to the previously displayed programme or advertisement, or an interactive shopping application. In other examples, the icon need not be displayed and the user may access additional content regardless of the presence of an icon.

As screen sizes and resolution increase, it has become practicable to display both a programme and an interactive application concurrently, in split screen mode. However, this greatly reduces the area available for programme display; for example, if the screen is split in half, the programme display area is reduced to a quarter of the full screen area, if the aspect ratio of the programme display is maintained. Alternatively, if the interactive content is overlaid on the programme display, this may obscure viewing of the programme content or the interactive content.

STATEMENTS OF THE INVENTION

According to the invention, there is provided a method of providing an interactive application interface simultaneously with a video programme display in a display area, wherein the proportion of the display area occupied by the interactive application interface varies or changes in response to interaction with the interactive application.

The interactive application may be selected from a menu of a plurality of interactive applications overlaid on the video programme display, which display may occupy substantially all of the display area.

The interactive application interface may display a plurality of menu items, and selection of one of the menu items may cause the proportion of the display area occupied by the interactive application interface to increase. The interactive application interface may display content relating to the selected menu item. The content may include video content. The video content may be played simultaneously with the video programme, or a static image linked to the video content may be displayed. User selection of the video content or of the linked static image may cause the video content to occupy substantially all of the display area and/or the video programme display to be removed from the display area.

Apparatus and/or a computer program arranged to perform the method of the invention may be provided.

BRIEF DESCRIPTION OF THE DRAWINGS

There now follows, by way of example only, a detailed description of preferred embodiments of the present invention in which.

DETAILED DESCRIPTION OF THE EMBODIMENTS

Television Display Apparatus

In this section, a satellite broadcast receiver is described as an example of apparatus on which a television display may be implemented. It is not intended as limiting to the scope of the invention. Other types of television display apparatus may include cable TV or Internet TV (IPTV) apparatus, and the receiver may include a plurality of different types of such apparatus. Additionally, the display apparatus may be any other audio/visual display apparatus, such as a personal computer, configured to receive and display television signals.

Figure 1:
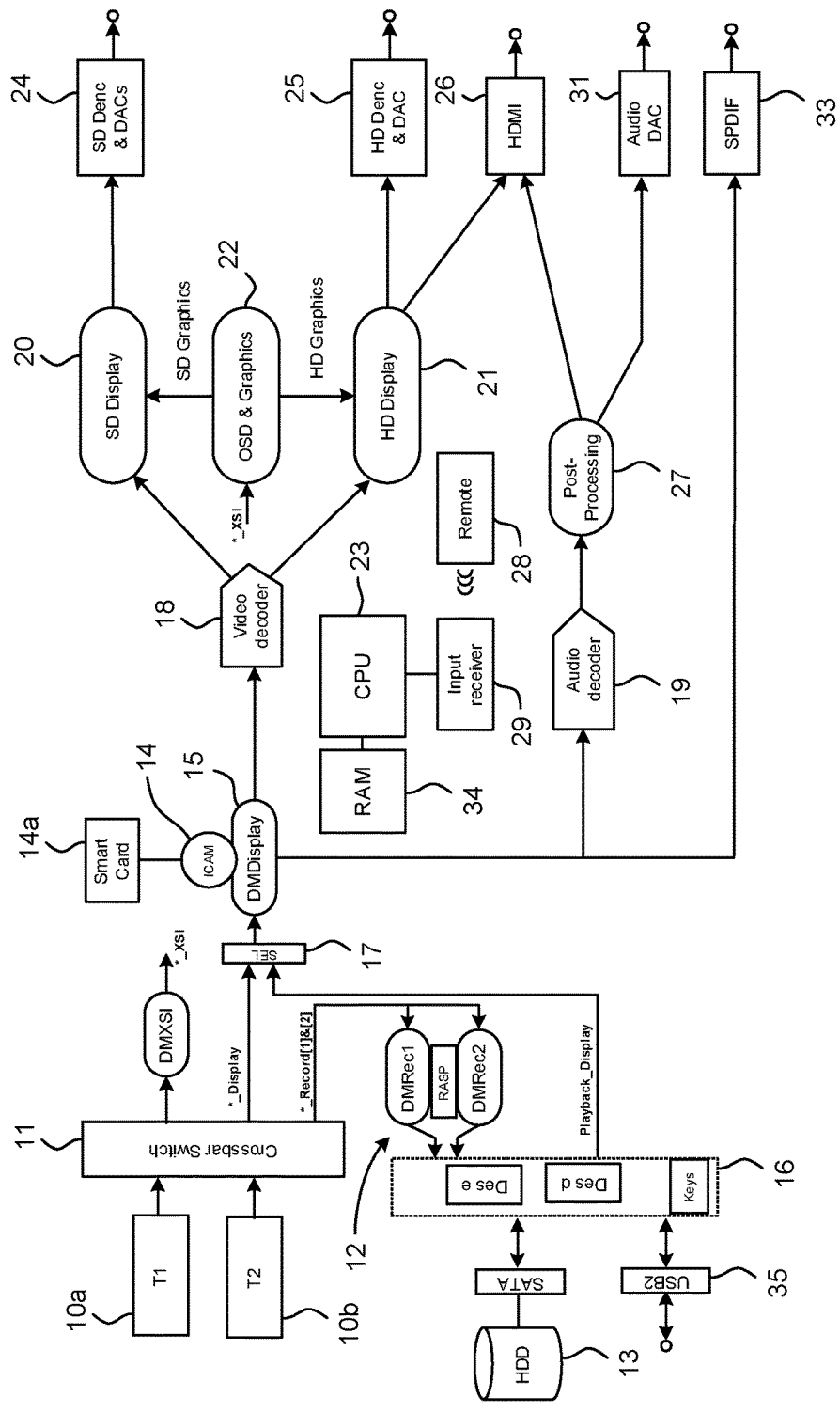
FIG. 1 is a block diagram of the functional components of a satellite broadcast receiver.

FIG. 1 shows a satellite broadcast receiver 3 for receiving television signals from a satellite television broadcast network. In this example, received signals are input to first and second tuners 10a and 10b but any number of tuners may be used in the receiver 3; for example, 8 or 16 different tuners may be provided. The received signals may comprise multiplexed channels. The tuners 10a and 10b are tuneable into the same or different channels of the satellite television broadcast network for simultaneous reception of the same or different television programmes. Signals from the tuners 10a and 10b are passed to a crossbar switch 11 which separates the data received from the tuners 10a and 10b into data for direct output to a television, data representing received television programmes for recording and subsequent playback, and user services and programme scheduling data, in accordance with the XSI standard, for example. The receiver 3 has a hard disk (or other memory medium) 13 which receives from the crossbar switch 11 compressed video and audio data for recording and subsequent playback via recording and playback circuitry 16. In the embodiment illustrated in FIG. 1, the receiver 3 includes two demultiplexer recording pipes (DMRec1 and DMRec2), which are coupled to Random Access Streaming Protocol circuitry (RASP) for analysing data in a received stream and indexing the data as it is received, but there may be more than two such pipes. The recording and playback circuitry 16 is also configured to perform decryption of received data, for example before the video and audio data is transmitted for playback on a display, using stored decryption keys according to the encryption technique used to encrypt the received data.

The received signals comprise digitally encoded data. In this example, the data is compressed using the Digital Video Broadcast/Moving Pictures Expert Group 2 or 4 (DVB/MPEG 2/4) standard which permits both programme data and additional data (for example interactive service data) to be transmitted in a single channel. DVB/MPEG 2/4 enables high compression ratios to be achieved. The hard disk 13 receives and stores compressed data. The data is decompressed only after retrieval from the hard disk 13.

Satellite (and indeed cable) programmes are usually scrambled to prevent unauthorised access by non-authorised subscribers. The receiver 3 therefore has an Integrated Conditional Access Module (ICAM) 14 which co-operates with a smart card 14a to determine whether the viewer has subscribed to a particular channel and is therefore authorised to access the channel. Parental control over channel access is also provided, at least in part, by the access control circuit 14. The receiver 3 further comprises a demultiplexing and descrambling circuit 15 which receives from a selector 17 data from the crossbar switch 11 for direct output or data from the hard disk 13 for playback. The demultiplexing and descrambling circuit 15 separates the data into video data and audio data for distribution to various locations within the receiver 3. The demultiplexing and descrambling circuit 15 is also controlled by the access control circuit 14 to enable the descrambling of the signal by authorised subscribers. The receiver 3 also comprises a video decoder 18 for decompression and processing of encoded video data received from the demultiplexing and descrambling circuit 15, and an audio decoder 19 for decompression and processing of compressed audio data, operating according to the MPEG 2/4 or H.264/H.265 standards, for example.

Decompressed video data is supplied to standard definition display circuitry 20 and high definition display circuitry 21 which combines the decompressed video data with corresponding standard definition or high definition on-screen display and graphics generated by on-screen display and graphics generation circuitry 22 using the user services and programme scheduling data. The standard definition display circuitry 20 provides the combined standard definition video and graphics data to a standard definition digital encoder and Digital to Analogue Converters (DACs) 24 where the data is encoded and converted into an appropriate format for direct input to a television set. The high definition display circuitry 21 supplies the combined high definition video and graphics data to a high definition digital encoder and Digital to Analogue Converter (DAC) 25 where the data is encoded into an appropriate high definition format for output to a high definition TV if so desired. The combined high definition video and graphics data is also supplied to a High Definition Multimedia Interface (HDMI) interface 26 which also receives decompressed audio data from the audio decoder 19 via audio post-processing circuitry 27, for output to an HDMI input of a high definition TV if so desired. Decompressed and processed audio data is also supplied to an audio DAC 31 for direct input to an analogue audio device or speakers. The demultiplexing and descrambling circuit 15 also outputs compressed digital audio to a proprietary audio interface, for example in accordance with the Sony/Philips Digital Interconnect Format (SPDIF) 33 for direct input to appropriate audio equipment.

The receiver 3 is controlled by a processor 23 which communicates with the various units of the receiver via a bus (not shown). The processor 23 has associated with it Random Access Memory (RAM) 34. The processor 23 controls operation of the receiver 3 by tuning the tuners 10a and 10b to receive signals for the desired channels by controlling the demultiplexing, descrambling and decompression so that the desired programme and/or interactive service data is displayed on the screen of the TV, and by controlling the hard disk 13 to record desired television programmes or to play back previously recorded television programmes. Viewer selection of desired programmes and customer services is controlled by viewer manipulation of a RCU 28, which in response to such viewer manipulation transmits control signals to an RCU interface 29 for input to the processor 23. The RCU interface 29 may include a Bluetooth® interface and/or an infrared (IR) interface for communication with an RCU 28, as described below.

The RCU 28 also allows the viewer to control of the operation of the hard disk 13 to record television programmes, to play back recorded television programmes and to program the recording of television programmes, etc.

Operation of the receiver 3 is controlled by software and/or firmware that makes the processor 23 responsive to control signals from the RCU 28 and/or additional data in the received signals. Interaction between hardware and software in the receiver 3 may be as described in detail in the Applicant's earlier international patent application published as WO 01/11865. Operation of the receiver 3 in receiving and decoding data representing television programmes and data defining scheduling and other information related to the programmes may be substantially as described in detail in the Applicant's earlier international patent application published as WO 96/37996. Operation of the receiver 3 in providing interactive services may be substantially as described in the Applicant's earlier international patent application published as WO 97/23997. The receiver 3 may provide an interactive services platform supporting one or more application programming interfaces (APIs) for interactive applications.

Within the Digital Video Broadcasting (DVB) standard for digital television broadcast there exists a standard for the transmission of schedule information such that it can be decoded and presented correctly to subscribers in the form of an Electronic Programme Guide (EPG). This DVB standard is known generally as the SI standard and can be found in the specification: ETS 300 468, ETSI Digital Broadcasting Systems for Television, Sound and Data Services; Specification for Service Information (SI) in Digital Video Broadcasting (DVB) Systems 2nd edition. Guidelines for using the specification are given in ETSI ETR 211-DVB SI Guidelines. The receiver 3 is designed to support the SI specification.

In addition to operating data for use in controlling access to channels, additional data in a channel can include brief programme schedule data representative of so-called event information tables (EITs) defining the scheduling of programmes in each channel. The programme schedule data is stored in the RAM 34 and, once stored, the scheduling information is available effectively instantaneously. Alternatively, the programme schedule data may be stored in the hard disk 13. The programme schedule data is transmitted regularly so that the receiver 3 will be updated substantially continuously. As those skilled in the art will appreciate, the transmitted information may be brief to enable each channel to carry a reduced set of programme schedule data without excessive overheads in terms of bandwidth requirements in each channel and memory requirements in the receiver.

In addition, a dedicated EPG channel transmits more detailed programme scheduling information, such as programme synopsis or other ancillary data associated with the scheduled programmes, which is stored in the hard disk 13. The information transmitted via this dedicated channel is updated more frequently and covers a longer period of time (e.g. two weeks). As a consequence, an up-to-date television programme schedule of a complete week should always be available. As explained in greater detail below, the receiver 3 is arranged to display the programme scheduling information for several of the channels over a predetermined period of time on the TV. Also, a viewer can interact with the receiver 3 to program recordings of television programmes, view a desired part of the available programme schedule, etc., on the basis of the information received via the dedicated EPG channel.

Since the tuners 10a and 10b can be tuned to receive different channels, it is possible for a first television programme in one channel to be displayed on a TV and recorded on the hard disk 13, while at the same time a second television programme in another channel is also recorded on the hard disk 13. Operation of the receiver 3 in providing simultaneous recording and playback may be substantially as described in the Applicant's earlier international patent application published as WO 01/11865.

The hard disk 13 of the receiver 3 is similar to conventional hard disks used in computer systems for storing large amounts of data. The hard disk 13 has a capacity of many gigabytes to a few terabytes (e.g. 500 gigabytes or 1 terabyte) and receives video and audio data via a SATA interface, for example, for storage in the compressed form in which it is received, for example, in accordance with the DVB/MPEG 2/4/H.264/5 standards as discussed above. This allows for the storage of several hours of television programmes (e.g. 100+ hours) on the hard disk 13. The hard disk 13 comprises two storage areas, one for the storage of television programme data, and the other for storing metadata which is used to control the hard disk 13, for example as discussed in greater detail in the Applicant's earlier patent publications mentioned above. The processor 23 controls the operation of the hard disk 13. More specifically, the processor 23 controls the recording and playback of television programmes to and from the hard disk 13. Other processors (not shown) can be used to control the hard disk 13 as appropriate, but the control is described in this document with reference to only processor 23 to facilitate understanding.

The receiver 3 also includes one or more external interfaces 35, such as a Universal Serial Bus 2 (USB2) port. The USB2 interface may be connected to a transcoding device (not shown) via a USB connector, which allows media content in a first format to be supplied from the receiver 3 and transcoded by the connected transcoding device into a second media coding format suitable for playback on a Personal Media Player (not shown). Operation of the receiver 3 in providing transcoding services may be substantially as described in the Applicant's earlier international patent application published as WO 06/125999.

The external interfaces 35 may include a network interface, such as an Ethernet™ interface for access to a local area network (LAN), to a wide area network (WAN) and/or to the Internet. Content for interactive applications may be accessed from the Internet.

Remote Control Unit (RCU)

Figure 2:
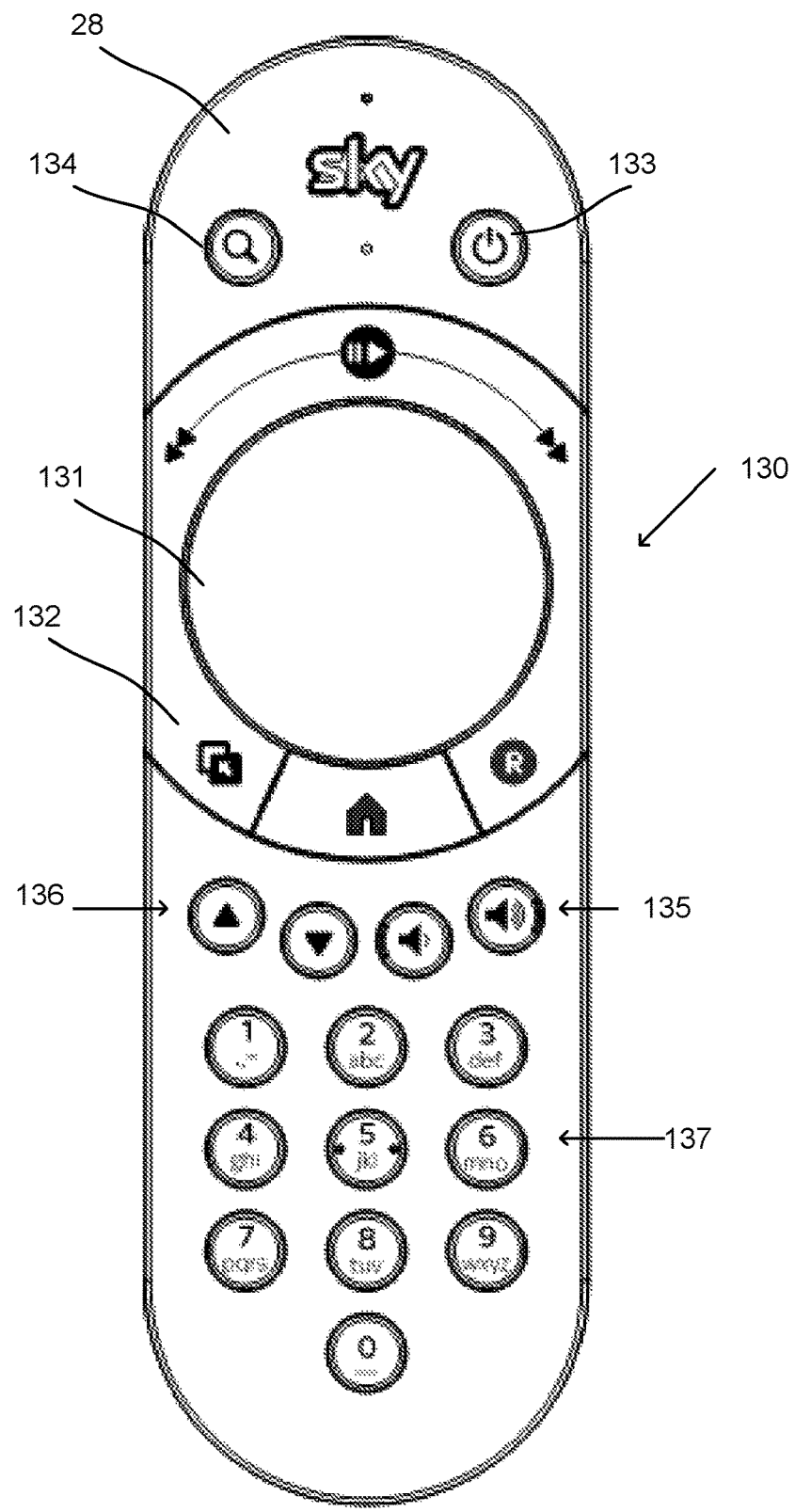
FIG. 2 is a schematic illustration of a remote control unit (RCU) for use with embodiments of the present invention.

As will be described in the embodiments below, a user navigates between particular display areas, programmes and menu items of an interactive user interface using one or more analog direction controls and/or appropriate button or key presses of a RCU 28. FIG. 2 shows an example of the front face of a RCU 28 for use with embodiments of the present invention. As shown in FIG. 2, the RCU 28 includes a capacitive touch pad 130 having a circular inner area 131 and an annular outer area 132. Markings may be provided on the inner area 131 and/or outer area 132, to indicate 'virtual' buttons or areas corresponding to specific functions, as will be described in more detail below.

The inner area 131 and outer area 132 may comprise physically discrete touch-sensitive areas, for example having separate outputs, or may comprise virtual areas of a single physical touch-sensitive area. In this embodiment, the inner area 131 comprises a discrete touch pad having one or more tactile or 'tact' switches coupled thereto, so that pressing the inner area 131 closes the tactile switch(es), preferably with tactile feedback to the user. In other words, the user may 'click' the touch pad of the inner area 131. Different tact switches may be closed by pressing different areas of the inner area 131, or a single tact switch may be closed by pressing any portion of the inner area 131. The latter may be preferable in that it does not require tilting of the touch pad of the inner area 131, which is mechanically complex and may lead to sticking.

The outer area 132 may include discrete sections coupled to tactile switches, which correspond to specific buttons, such as back-up button 123, home button 124 and record button 125. One or more other sections may be touch sensitive but not coupled to any tactile switches, such as the upper section of the outer area 132 as shown in FIG. 2. In this case, virtual buttons in the upper section are marked, for ease of identification by the user. The operation of such virtual buttons is determined by an RCU interface in the receiver 3, as described below.

The remote control 28 may also have physical buttons (i.e. keys or buttons defined in the hardware of the remote), separate from the capacitive touch pad 130. Examples in this embodiment include a power on/off button 133, search button 134, volume up/down buttons 135, channel up/down buttons 136 and numeric keys 137. Other configurations of physical buttons may be provided. Optionally, the capacitive touch pad may be replaced by discrete physical buttons, for example for cost reasons. However, the capacitive touch pad, or other analog direction control, may be required for some of the embodiments described below.

RCU to UI Interface

Figure 3:
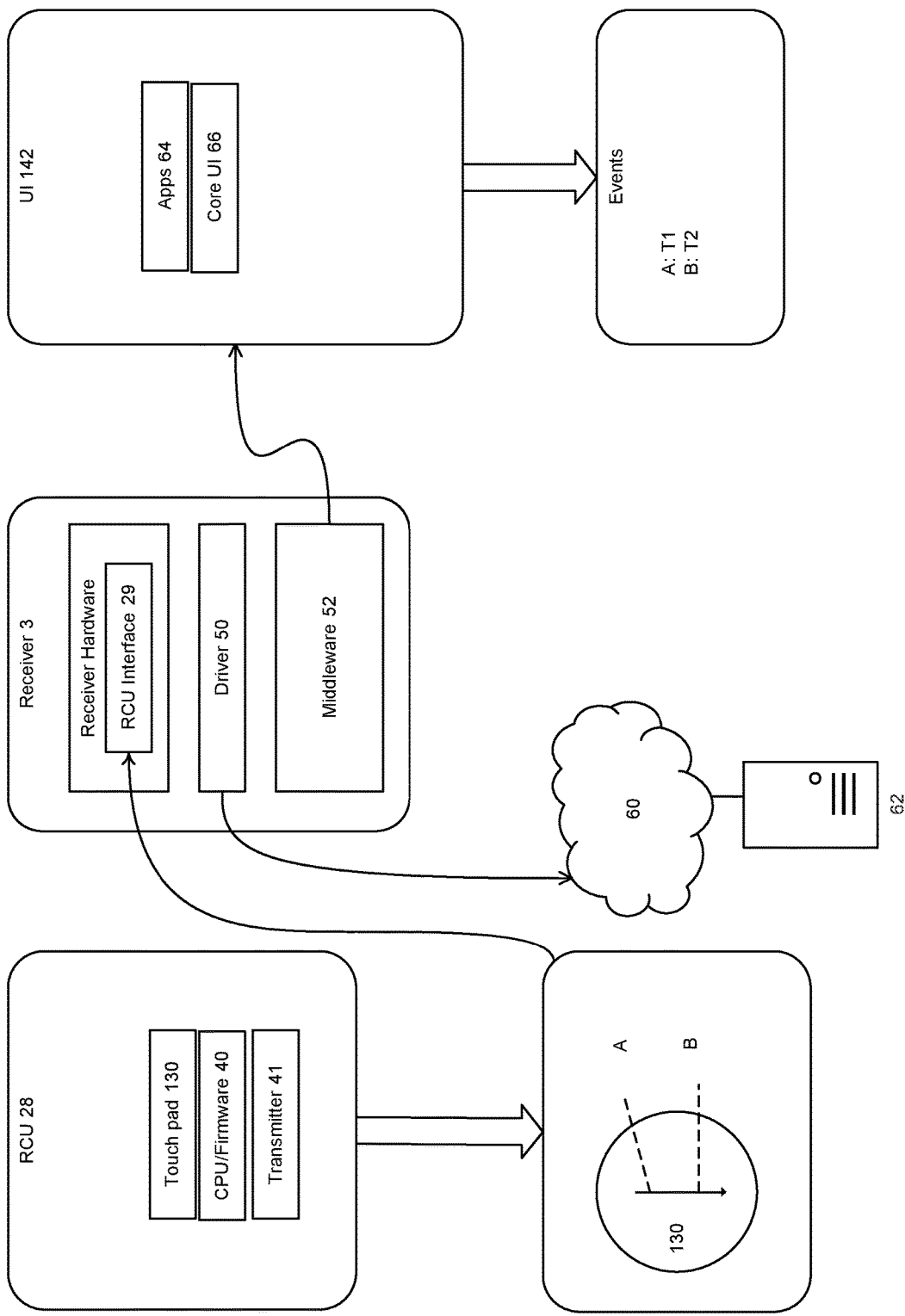
FIG. 3 is a schematic diagram of the RCU to UI interface in an embodiment of the invention.

FIG. 3 illustrates schematically the interface between the RCU 28 and the UI 142. The RCU 28 includes a CPU and firmware 40 and a transmitter 41 for communication with the RCU interface 29 using infra-red (IR) signals and/or short-range wireless link signals such as Bluetooth® signals, which allow higher bandwidth bi-directional communication. The RCU 28 may include a microphone (not shown) for receiving voice commands from the user; these are encoded as audio signals and sent over the wireless link to the receiver 3. Voice recognition is performed on the audio signals to interpret the commands; the voice recognition may be performed at the receiver 3 or by a remote server 62 connected to the receiver 3 over a network 60, such as the Internet.

The RCU 28 detects the absolute X and Y coordinates of the touch position on the areas 131 and 132 as discrete touch events and sends these to the RCU interface 29 periodically (e.g. at 100 Hz).

The RCU 28 also outputs, to the RCU interface 29, signals indicating pressing of the tactile switches and physical buttons.

The signals received by the RCU interface 29 are converted by an RCU driver 50 at the receiver 3 into user interface commands for output to user interface (UI) components 142, via middleware 52. The UI components 142 include a core UI layer 66, for example Qt™ and an app layer 64, for example Luna. The touch events A, B are time-stamped with the times T1, T2 at which they were received by the UI components 142.

The method of conversion of signals by the driver 50 depends on the type of input from the RCU 28. For example, a press of a physical button on the RCU 28 is converted into a corresponding user interface command. However, the outputs from the touch pad 130 require more complex conversions, as described below.

Figure 4:
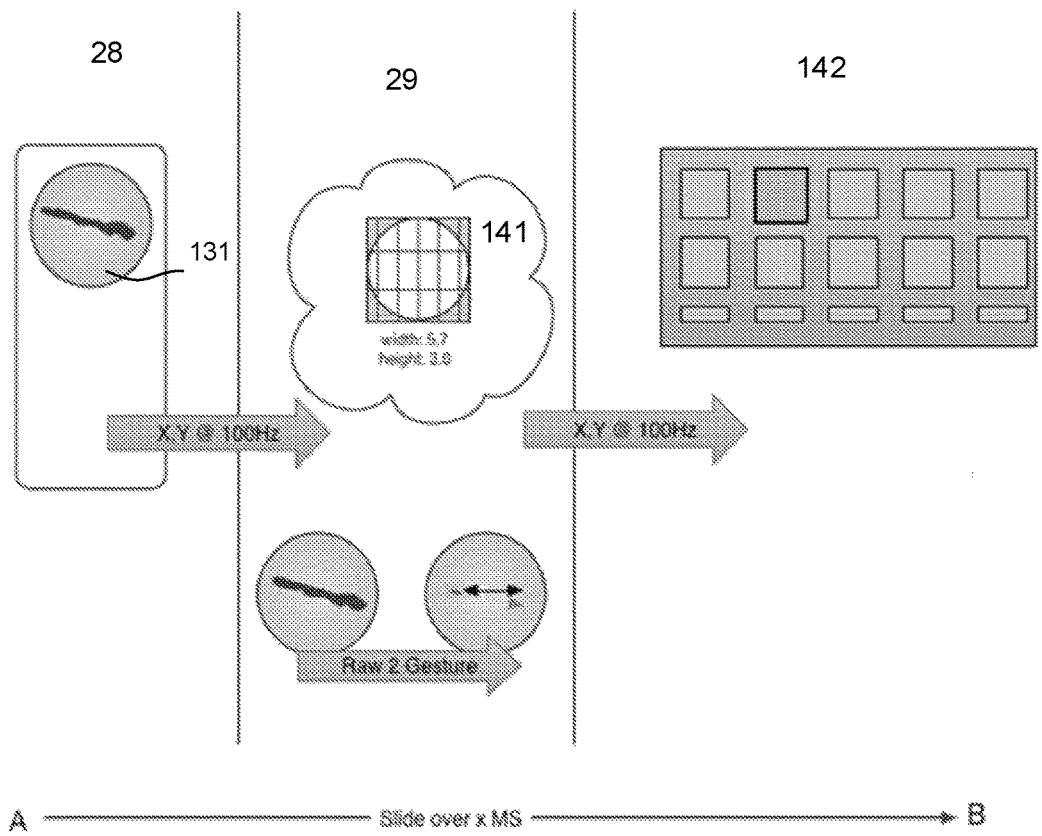
FIGS. 4 and 5 are schematic diagrams illustrating the operation of an RCU interface in an embodiment of the invention.
Figure 5:
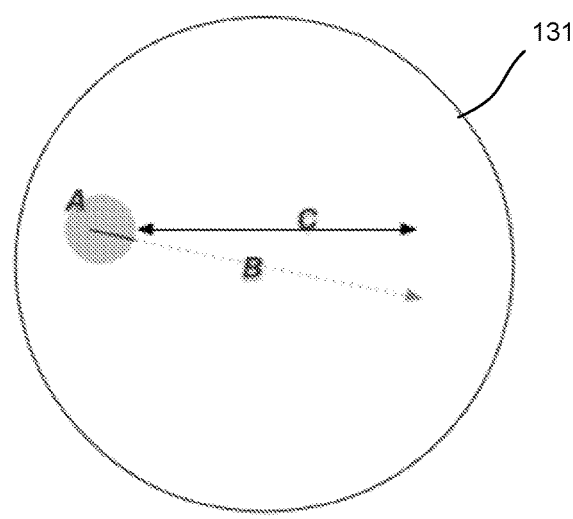

As illustrated for example in FIGS. 4 and 5, a tap or click by the user on a single position of the inner area 131 is converted to an absolute position in a grid 141 having a low resolution, such as 5 horizontal cells by 3 vertical cells. This absolute position may be used to select an item in a corresponding grid in a user interface component 142. For example, as shown in FIG. 4, a tap in a position corresponding to the coordinate {2, 3} on the grid 141 may cause the user interface component 142 to highlight a cell with a corresponding coordinate on a displayed grid. Where the tap is performed with enough force to close a tactile switch of the inner area 131, this is recorded as a 'click' by the RCU interface 29 and may result in a different command being output to the user interface 142, which may then perform a different action depending whether a tap or a click is performed at an absolute position. Alternatively, a click may be required and a tap alone may result in no action.

In another example, the user may input a relative movement command, for example using a touch movement or gesture performed on the inner or outer area 131, 132 of the touch pad 130. The RCU interface 29 receives as input the periodic X and Y coordinates of the touch position and detects whether a series of these periodic coordinates corresponds to a predefined gesture, for example by reference to a stored gesture library. If a predefined gesture is detected, the RCU interface 29 outputs the gesture with detected parameter values, if relevant. The output gestures are provided as periodic input to the UI component(s) 142. Preferably, this output is continuous so that the user interface can respond to the gesture as it is performed. This allows the user interface to respond smoothly, preferably with an animation effect to provide visual feedback to the user.

A plurality of different possible gestures may be predefined in the gesture library, and in the present embodiment there are at least two such gestures, referred to as 'slide' and 'swipe'. A 'slide' gesture comprises a long, approximately linear touch movement; the corresponding output indicates the velocity and optionally the acceleration of the movement, as well as its horizontal or vertical direction; the corresponding output is preferably output substantially continuously or periodically, and varies according to the current properties of the 'slide' gesture until the gesture is determined to have finished, for example in response to the user moving out of contact with the touch pad 130. A 'swipe' gesture comprises a short, quick linear touch movement; the corresponding output is simply the horizontal or vertical direction of the swipe.

Preferably, the RCU interface 29 filters out small, involuntary gestures by the user, caused for example by the user resting a digit on the touch pad 130. As illustrated in FIG. 5, the RCU interface 29 does not respond to any movement within a zone A defined with respect to the initial touch point on the inner area 131, for example within a predetermined radius from the initial touch point. However, when the touch point moves outside the zone A, the RCU interface 29 determines the direction of travel of the touch point from the initial point of contact, and begins to output this direction.

The UI components 142 are used to display the EPG in a grid format, and various horizontal or vertical menus, and therefore need only respond to vertical or horizontal movement commands; diagonal or rotational commands are not supported. The RCU interface 29 therefore interprets a directional gesture by the user as being entirely horizontal or vertical and provides a corresponding output to the UI components 142. For example, the user may move the touch point along the vector B, which is at an angle to the horizontal direction but closer to being horizontal than vertical. The RCU interface 29 therefore resolves the vector B along a horizontal vector C. The direction of the gesture is 'locked' in a horizontal direction, and any subsequent movement of the touch point will be resolved in that direction until the user's finger is lifted from the touch pad 130. Hence, the RCU interface 29 will output subsequent changes of direction along the horizontal, but will not respond to any vertical component of the gesture. Likewise, if the gesture is determined to be vertical, only the vertical component will be output.

Figure 6:
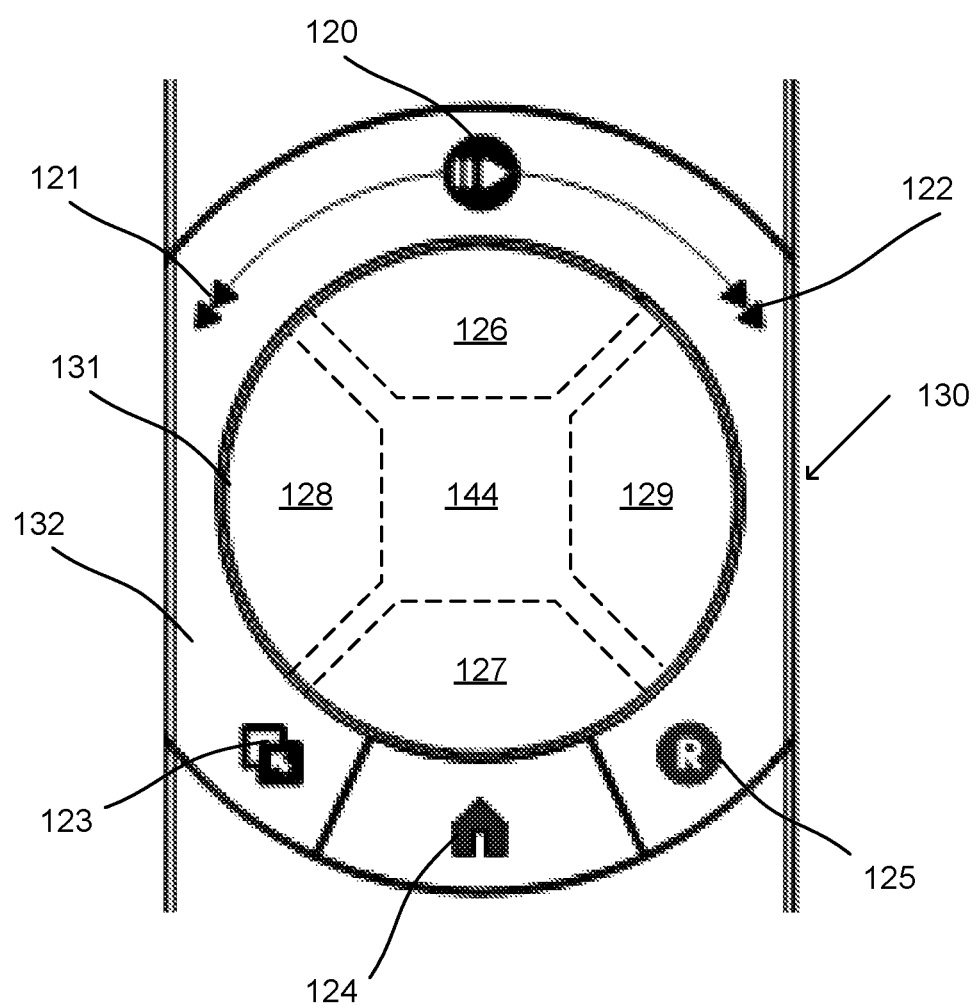
FIG. 6 shows virtual button areas on a touch pad of the RCU.

The RCU interface 29 may also respond to discrete taps or clicks on predetermined areas of the touch pad 130 corresponding to virtual buttons, as shown for example in FIG. 6. For example, on the inner area 131, virtual 'up', 'down', 'left' and 'right' buttons 126, 127, 128, 129 may be defined, optionally with a central 'select' button 144, such that a tap or click in the corresponding area causes the RCU interface to output an up, down, left, right or select command. These commands may be advantageous for backwards compatibility with remote or game controls that have corresponding physical buttons. The virtual buttons need not be visually marked on the inner area 131, and their shape and size may be reconfigured according to user interface requirements.

Where the inner area 131 has only one corresponding tactile switch, the position of a 'click' may be determined from the detected touch position on the inner area 131. Therefore, multiple virtual clickable buttons may be defined, using only a single tactile switch.

Virtual buttons may also be defined on the outer area 132. In this example, the upper section of the outer area 132 contains virtual play/pause button 120, rewind button 121 and fast forward button 122, such that a discrete tap on these buttons causes the RCU interface to output a corresponding play/pause, rewind and fast forward command. A 'slide' gesture from the play/pause button 120 to the rewind button 121 or fast forward button 122 may generate a corresponding rewind or fast forward speed command, with a speed dependent on the length and/or speed of the 'slide' gesture.

The RCU interface 29 and UI component 142 may also respond to a combination of a gesture and one or more clicks. For example, a 'slide' followed by one or more clicks may be used to scroll through items in the user interface and then step through individual items, giving a combination of gross and fine control. This may be useful for example when controlling an on-screen keyboard, where the slide gesture is used for relative movement to an area of the keyboard, while the clicks are used to select between different keys within that area.

User Interface with Visual Feedback

The UI components 142 provide continuous visual feedback of user interaction with the RCU 28, and particularly with the touch pad 130. With a conventional RCU, a single button press causes a discrete change to the user interface, such as a different item being selected or highlighted, so the user does not need additional visual feedback. With an analog direction control such as the touch pad 130, a gesture may not immediately result in a discrete change to the user interface, so it is advantageous to provide continuous visual feedback in response to a gesture. On the other hand, it would be distracting to show on the display a pointer that follows every movement of the analog direction control, as is the case with a conventional mouse pointer.

In an embodiment of the invention, an indicator is shown on the display indicating horizontal or vertical motion detected on the touch pad 130, with the filtering and directional locking described above. The indicator may comprise a background lighting effect or 'spotlight' centred on the location of the indicator on the display. The indicator is displayed separately from highlighting of EPG or menu items on the display, but the highlighting may change in response to the indicator moving on to a displayed item, as described below with reference to FIGS. 6a to 6c, which show an example of items I1, I2 and I3 in a grid as part of an EPG display.

Figure 7A:
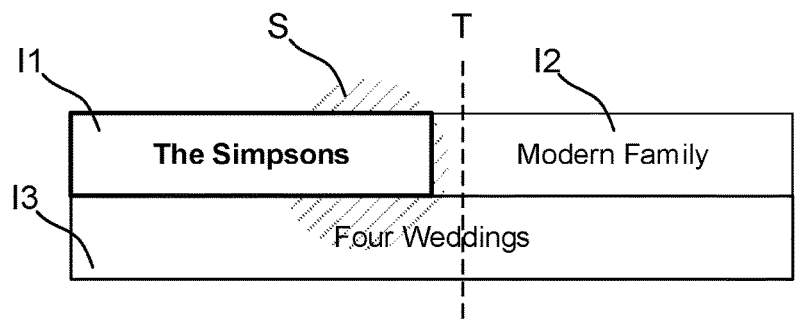
FIGS. 7a to 7c are schematic diagrams illustrating continuous visual feedback on a display in response to a gesture performed on the touch pad.
Figure 7B:
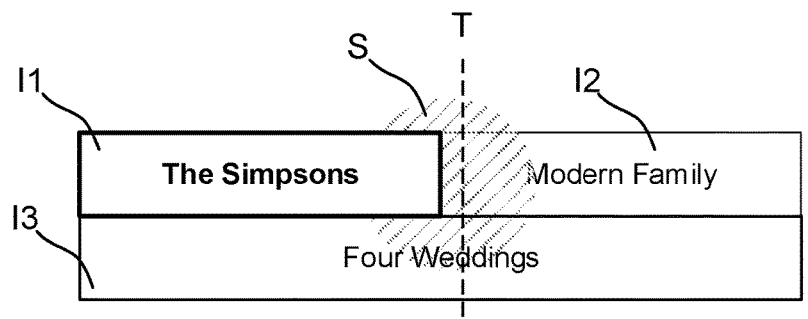
Figure 7C:
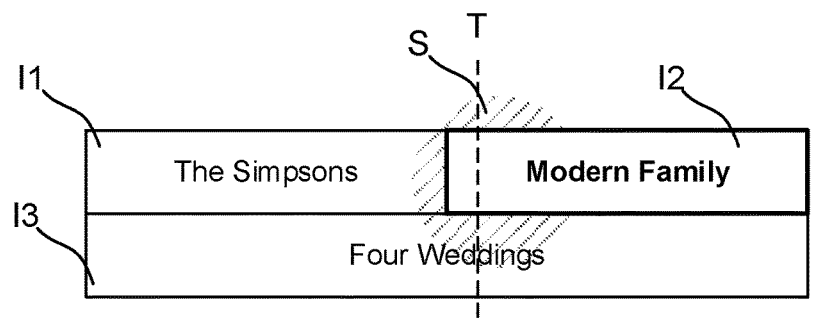

The indicator centre position is shown as a dashed cross in the figures, but in an actual display only the spotlight, centred on the indicator position, is shown. As shown in FIG. 7a, the item I1 is currently highlighted and the indicator S is centred under the item I1. The user performs a horizontal slide gesture to the right, so that the centre of the indicator S moves under the next item I2 to the right. A horizontal threshold T is defined, a predetermined distance past the border between the items I1 and I2 in the direction of travel of the indicator S. In FIG. 7b, the indicator position has travelled past the border, but not past the threshold T, and item I1 is still highlighted. In FIG. 7c, the indicator position has travelled past the threshold T and the next item I2 is now highlighted.

A similar procedure is followed when performing a slide gesture to the left, except that the threshold T is define a predetermined distance to the left of the border between the items I1 and I2, since the direction of travel is to the left from item I2 to I1.

A similar procedure may be followed when moving in a vertical direction, with the threshold T defined a predetermined distance past a horizontal border between items in the direction of travel. The threshold T provides hysteresis between the indicator position and the highlighting of items, so that the highlighting does not flip rapidly between items as the indicator position passes back and forth over the border between them.

Alternatively, the threshold T may be defined a predetermined distance before the border, or on the border, determining how quickly the next item should be highlighted, and whether hysteresis is required.

However, preferably the spotlight or other indicator S does not move in the vertical direction, but a scroll operation in the vertical direction causes the menu items to scroll vertically beneath the indicator. When the scroll operation is completed (for example by the user ending a slide gesture), the menu items may 'snap' into alignment with the indicator S so that only one menu item is highlighted, but this may cause a problem when the indicator is half way between two menu items and it is not clear to the user which menu item will be selected.

Figure 8A:
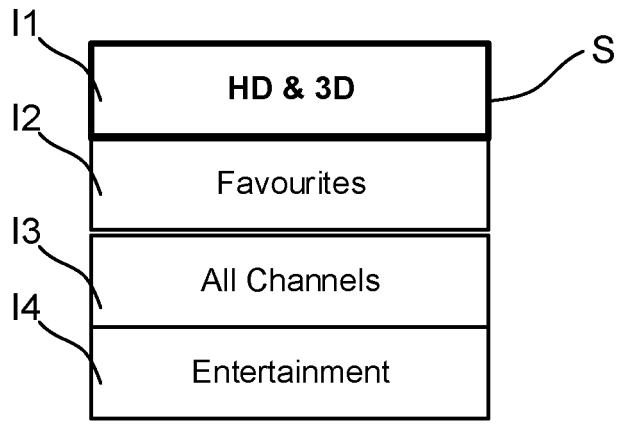
FIGS. 8a to 8c show a scroll operation for a vertical menu.
Figure 8B:
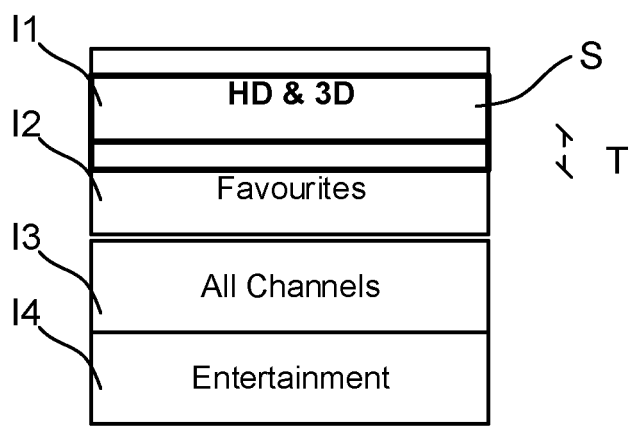
Figure 8C:
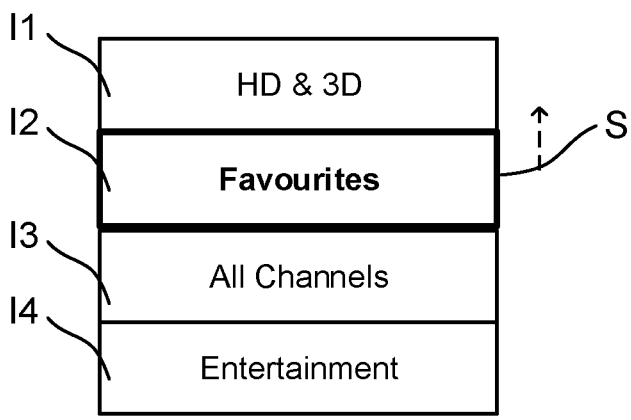

A solution to the above problem is illustrated in FIGS. 8a to 8c. In this case, a vertical menu comprises a set of vertically arranged rectangular items I1-I4 and the indicator S comprises a rectangle that is fixed in the vertical direction. At the start of a vertical scroll operation, as shown in FIG. 8a, the first item I1 ('HD & 3D') is positioned under and aligned with the indicator S. In response to a vertical gesture input by the user, such as a 'slide' gesture, the vertical menu begins to move vertically under the indicator S, as shown in FIG. 8b. This provides visual feedback of the gesture to the user. When the vertical menu has moved by a threshold amount T less than half the vertical height of the items I1-I4, for example by 20-30% or 25% of the vertical height, the vertical menu 'snaps' or slides quickly into the position shown in FIG. 8c, as indicated by the dashed arrow, with the indicator S aligned with the next item I2 in the direction of movement. If the gesture continues, the menu continues to move as shown in FIGS. 8b and 8c for each item I1-I4 in turn.

In a variant where the items I1-I4 have varying vertical heights, the threshold amount for initiating the 'snap' action may be a constant, preferably less than half the smallest height among the items I1-I4. Hence, the same length of gesture is required to move each item under the indicator S. Alternatively, the threshold amount may be proportional to the height of the next item I1-I4 in the direction of motion and/or the height of the currently selected item I1-I4.

A similar 'snap' action may be applied to alternative arrangements, for example to horizontal menus and/or to scenarios where the indicator S moves and the items I1-I4 are stationary.

Interactive Applications

The receiver 3 may display the current programme simultaneously with one or more interactive applications, as shown for example in FIGS. 9 and 10a to 10e. In this embodiment, the proportion of the display area taken up by the interactive application(s) progressively increases, and the proportion taken up by a programme display progressively decreases, as the user interacts with the interactive application(s), for example by navigating a menu to select content.

Figure 10A:
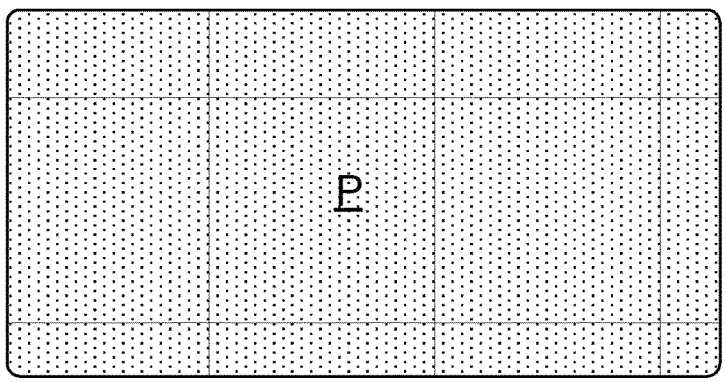
FIGS. 10a to 10e are diagrams of a television display area in the embodiment of FIG. 9.

In this example, the display starts (step S1) with the programme display P occupying substantially the entire display area (i.e. displayed in full screen), as shown in FIG. 10a. The displayed programme may be a live broadcast, a video on demand (VOD) programme or a previously recorded programme for example.

Figure 10B:
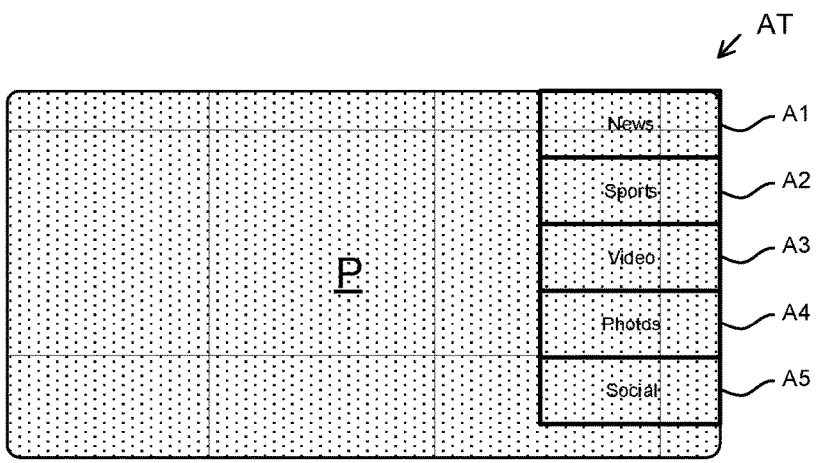
Figure 10C:
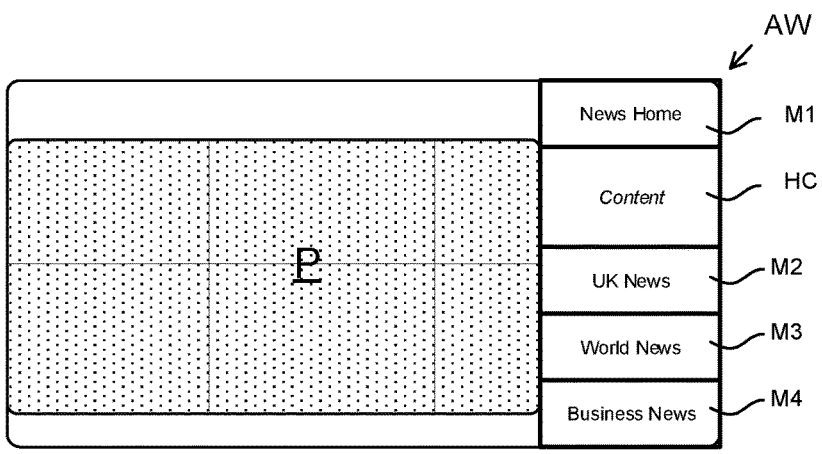
Figure 10D:
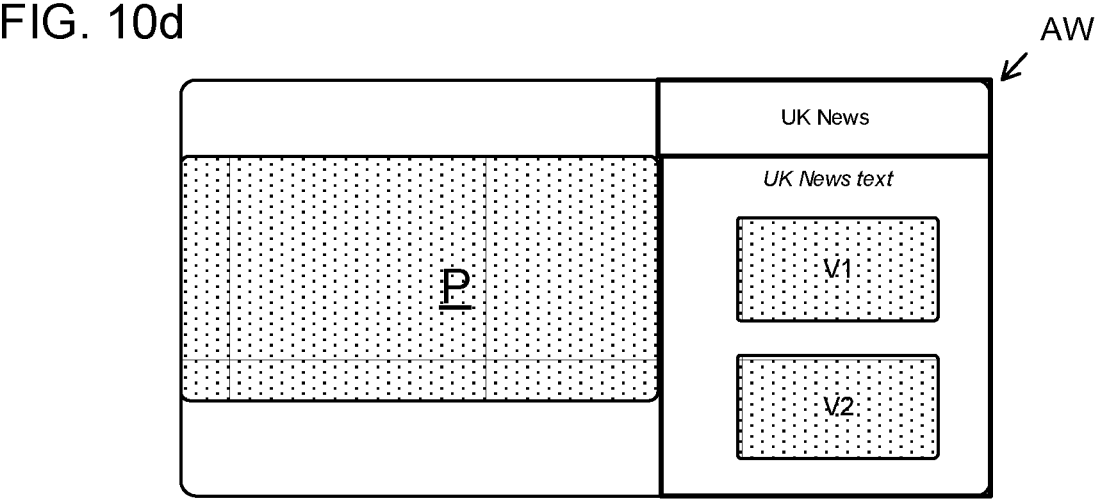
Figure 10E:
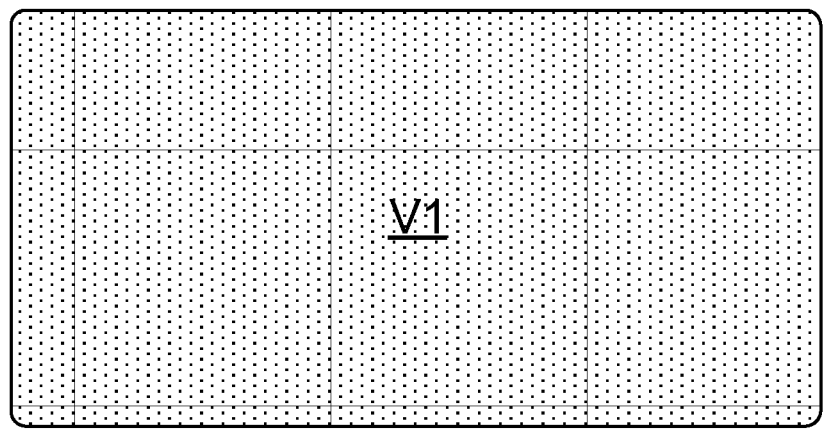

The user may request access to interactive applications, for example by pressing a corresponding button or performing a corresponding gesture on the RCU 28. In response to that request, an interactive application menu or tray AT is superimposed or overlaid on the programme display P displayed in full screen (step S2), as shown in FIG. 10b. Preferably, the application tray AT is at least partially transparent so that the programme display P may be viewed through it. In this case, the application tray AT is displayed as a vertical menu to one side of the display area, and occupying a small proportion (e.g. approximately 20%) of the width of the display area.

The application tray AT identifies (for example as a menu) a plurality of different interactive applications A1 . . . A5 selectable by the user. In this example, the interactive applications include News, Sports, Video, Photo and Social applications. The user may select one of the interactive applications displayed in the application tray AT, for example using the menu navigation function described above with reference to FIGS. 8a to 8c. In response to user selection of an interactive application, the application tray AT is removed from the display area and an application window AW is displayed instead (step S3 and FIG. 10c). The application window AW is displayed in split screen (e.g. side by side) with the programme display P, which therefore occupies less than the full display area. In this case, the application window AW is displayed as a vertical menu to one side of the display area, and occupying a small proportion (e.g. approximately 20% of the width) of the display area, with the programme display P occupying the remaining 80% of the width of the display area.

The application window AW may display a plurality of menu items M1 . . . M4 as well as content, such as home content HC relating to a home or default menu option. The home content HC may include still images or video clips. Scrolling of the menu items M1 . . . M4 may be enabled, to allow a greater number of menu items to be displayed within the application window AW.

In this case, the News application has been selected and the menu items relate to News Home, World News, Business News and Sports News. The home content HC relates to a news headline, and may include text and/or still images.

The user may select one of the menu items M1 . . . M4, in response to which the application window AW expands to occupy a larger proportion (e.g. 40% of the width) and the programme display P occupies a smaller proportion (e.g. 60% of the width) of the display area than previously (step S4 and FIG. 10d). The application window AW displays content corresponding to the selected menu item, including for example video content items V1 and V2 in windows within the application window AW. Where the receiver 3 is able to play out multiple video streams simultaneously, the video content items V1, V2 may be played simultaneously with the programme display P; preferably, only the audio from the displayed programme is output. If the receiver 3 is only able to play out one video stream at a time, then preferably the programme display P plays the video content of the programme and still images linked to the video content items V1, V2 are displayed; the still image may be extracted from the video content items V1, V2 or provided as a separate image. The video content items V1, V2 may be obtained from a broadcast channel or via a network, such as the Internet, and may be buffered or pre-recorded on the hard disk 13. Scrolling may be enabled within the application window AW to allow selection from a larger number of video content items V1, V2.

The user may select a video content item V1, V2 from the application window AW. In response to that selection, the selected video content item V1 is played in full screen and the programme display P is no longer displayed (step S5, FIG. 10e).

Figure 9:
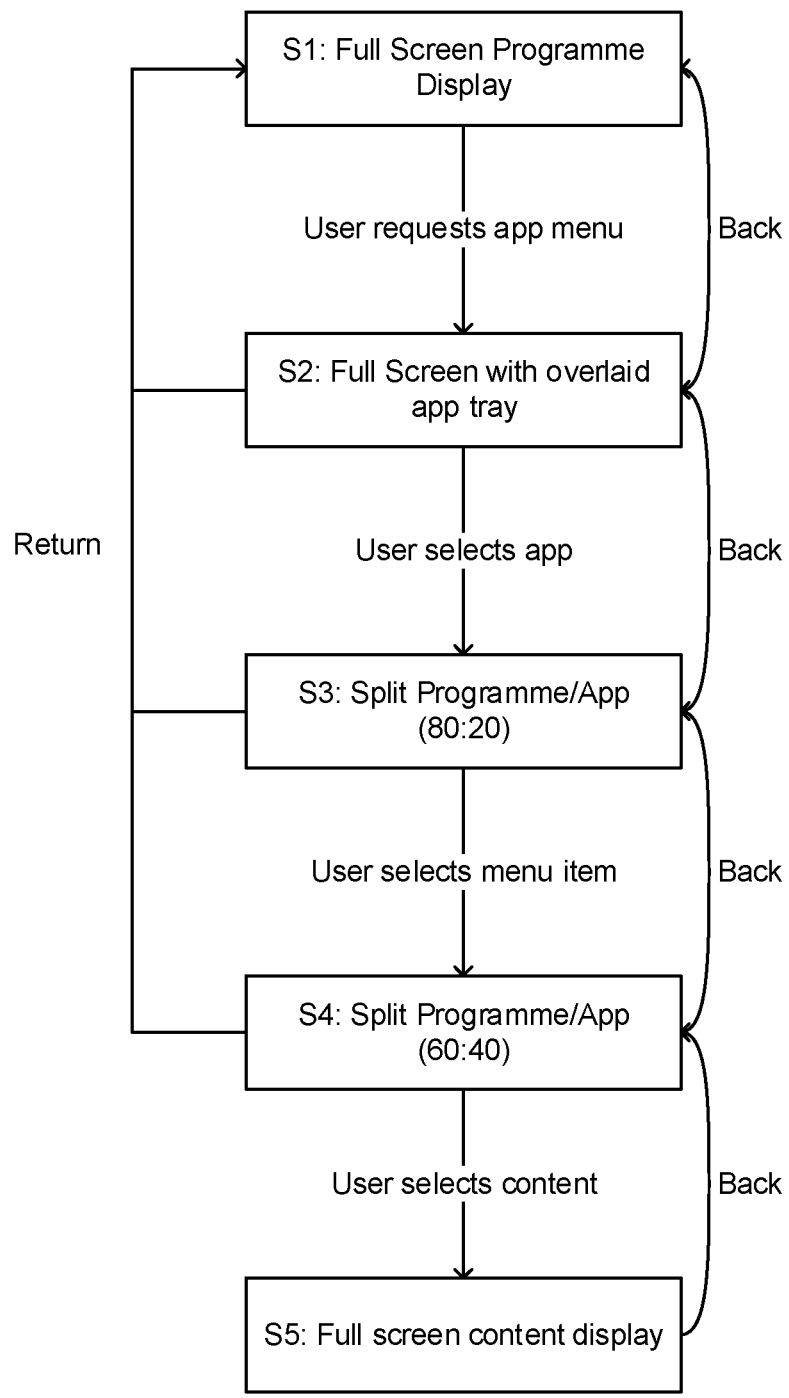
FIG. 9 is a flowchart of the operation of an interactive application interface in an embodiment of the invention.

As shown in FIG. 9, the user may navigate back by one or more steps, for example by pressing a corresponding button or making a corresponding gesture input on the RCU 28. The user may alternatively return directly to the full screen programme display P as in step S1 or to another display such as an EPG screen or Home screen, by pressing a corresponding button or making a corresponding gesture input.

Preferably, the transition between the application tray AT and application window AW, and the change in size of the application window AW are animated so that the transition is displayed as a series of intermediate stages or frames and the user may more easily perceive the transition.

Although the above example has been described mainly with reference to a News application, embodiments of the invention may be applied to other types of interactive application. For example, in a photo or video application the menu items M1 . . . M4 may correspond to different categories or folders, and the content may comprise individual photos or videos. In a social application, the menu items M1 . . . M4 may correspond to different options such as timeline, news feeds and messages and the content may comprise media content from the selected option.

Navigation between the different steps S1 to S5 may vary according to the interactive application A1 . . . A5 and/or menu item M1 . . . M4 selected. For example, in some interactive applications the user may navigate directly from step S2 (overlaid app tray) to step S4 (larger app window) or even step S5 (full screen content display). This may be advantageous in photo or video interactive applications in which a larger window is required to display thumbnails or video clips. In step S4, the programme display P may occupy less of the width of the display area than the application window AW, for example in the ratio 40:60 or even 80:20.

In another embodiment, navigation may jump directly from step S3 (smaller app window) to step S5 (full screen content display), for example where content indicated in the application window AW in step S3 is to be viewed directly in full screen. This may be advantageous for example in an interactive music or video application where the display of music or video side by side with the programme display P is less desirable.

In another embodiment, navigation past step S3 or step S4 may be inhibited. For examples, in a 'Scores' menu item within an interactive sports application, the narrow application window AW in step S3 may be sufficient to display the scores of selected sporting events, and no further content is linked to the scores so that navigation past step S3 is unnecessary.

In an embodiment where only one interactive application is available, navigation may skip from step S1 to step S3, bypassing the application tray AT.

Navigation may involve one or more further intermediate steps. For example, an intermediate step between steps S4 and S5 may involve the application window AW occupying the full display area.

Further Alternative Embodiments

The embodiments described above are illustrative of rather than limiting to the present invention. Alternative embodiments apparent on reading the above description may nevertheless fall within the scope of the invention.

In the embodiments described above, specific examples are provided of various separate display screens. As those skilled in the art will appreciate, many specific details of the illustrated screens are provided merely by way of example.

The above embodiments are presented as separate embodiments but those skilled in the art will appreciate that any combination of the display screens and aspects therein described in the above embodiments and alternatives is possible.

The invention claimed is:

1. A method of providing an interactive application user interface simultaneously with a video program display within a display area of a television receiver, the method comprising:

in response to a user requesting access to interactive applications through interfacing with the television receiver, opening a menu of interactive applications superimposed on the video program display, with the video program display occupying substantially the entire display area;

in response to selection of one of the interactive applications by the user from the menu of interactive applications, opening an interactive application window which in a first state comprises a plurality of menu items, with the application window and video program display arranged in a split-screen arrangement; and in response to the user selecting one of the menu items, causing the application window to enter a second state in which content relating to the selected menu item is displayed, wherein a proportion of the display area occupied by the application window is greater in the second state than in the first state and the proportion of the display area occupied by the video program display in the second state is less than in the first state.

2. The method of claim 1, wherein the content includes one or more video content items.

3. The method of claim 2, wherein in the second state at least one said video content item is output simultaneously with the video program display.

4. The method of claim 2, wherein in the second state one or more still images corresponding to the video content items are output.

5. The method of claim 2, wherein user selection of one of the video content items causes the selected video content item to be displayed without the video program display within the display area.

6. An apparatus for providing an interactive application user interface simultaneously with a video program display within a display area of a television receiver comprising:
a processor; and
a memory that includes program code arranged to perform the following when executed by the processor:
in response to a user requesting access to interactive applications through interfacing with the television receiver, opening a menu of interactive applications superimposed on the video program display, with the video program display occupying substantially the entire display area;
in response to selection of one of the interactive applications by the user from the menu of interactive applications, opening an interactive application window which in a first state comprises a plurality of menu items, with the application window and video program display arranged in a split-screen arrangement; and
in response to the user selecting one of the menu items, causing the application window to enter a second state in which content relating to the selected menu item is displayed, wherein a proportion of the display area occupied by the application window is greater in the second state than in the first state and the proportion of the display area occupied by the video program display in the second state is less than in the first state.

7. The apparatus of claim 6, wherein the content includes one or more video content items.

8. The apparatus of claim 6, wherein in the second state at least one said video content item is output simultaneously with the video program display.

9. The apparatus of claim 6, wherein in the second state one or more still images corresponding to the video content items are output.

10. The apparatus of claim 6, wherein user selection of one of the video content items causes the selected video content item to be displayed without the video program display within the display area.

11. A tangible computer readable medium for providing an interactive application user interface simultaneously with a video program display within a display area of a television receiver comprising program code arranged to perform the following when executed on a suitable configured processor or processor:
in response to a user requesting access to interactive applications through interfacing with the television receiver, opening a menu of interactive applications superimposed on the video program display, with the video program display occupying substantially the entire display area;
in response to selection of one of the interactive applications by the user from the menu of interactive applications, opening an interactive application window which in a first state comprises a plurality of menu items, with the application window and video program display arranged in a split-screen arrangement; and
in response to the user selecting one of the menu items, causing the application window to enter a second state in which content relating to the selected menu item is displayed, wherein a proportion of the display area occupied by the application window is greater in the second state than in the first state and the proportion of the display area occupied by the video program display in the second state is less than in the first state.

12. The computer readable medium of claim 11, wherein the content includes one or more video content items.

13. The computer readable medium of claim 11, wherein in the second state at least one said video content item is output simultaneously with the video program display.

14. The computer readable medium of claim 11, wherein in the second state one or more still images corresponding to the video content items are output.

15. The computer readable medium of claim 11, wherein user selection of one of the video content items causes the selected video content item to be displayed without the video program display within the display area.

* * * * *